Jan. 22, 1935.  A. O. AUSTIN  1,988,824
EXPANSION TANK FOR ELECTRICAL APPARATUS
Filed Dec. 11, 1931
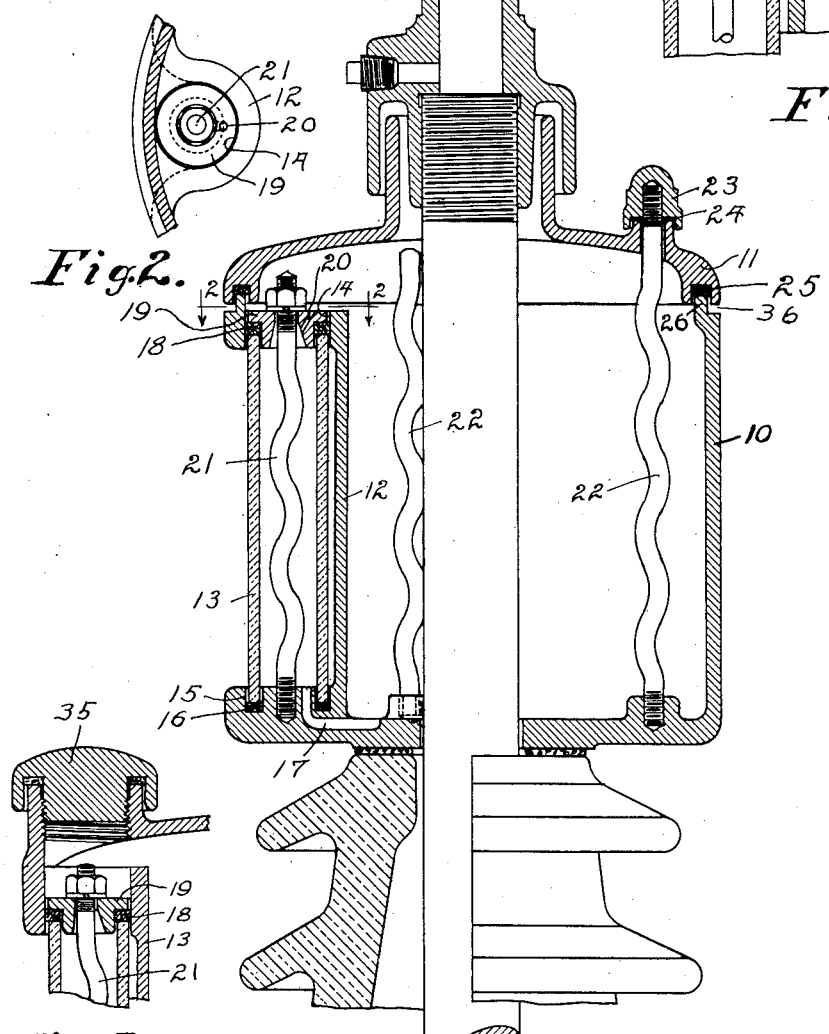
Fig.1.
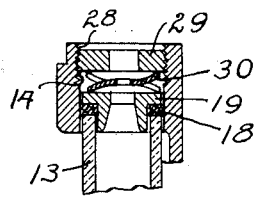
Fig.3.
Fig.2.
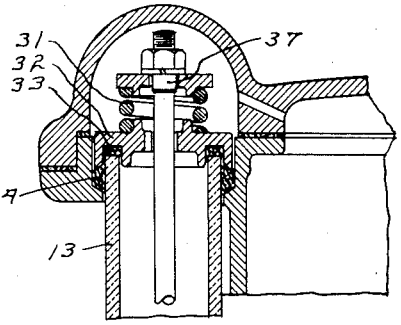
Fig.4.
Fig.5.
INVENTOR
Arthur O. Austin
BY
ATTORNEY Patented Jan. 22, 1935

1,988,824

UNITED STATES PATENT OFFICE 1,988,824

EXPANSION TANK FOR ELECTRICAL APPARATUS

Arthur O. Austin, near Barberton, Ohio, assignor, by mesne assignments, to The Ohio Brass Company, Mansfield, Ohio, a corporation of New Jersey Application December 11, 1931, Serial No. 580,472

5 Claims. (Cl. 220—82)

This invention relates to plenum or expansion tanks for containers filled with liquid, and especially for containers filled with an insulating fluid such as oil. The invention is particularly applicable to expansion tanks for bushing insulators.

One object of the invention is to provide a tank in which the joints are liquid tight under all conditions.

A further object of the invention is to provide a tank having a gage glass with liquid tight joints between the glass and tank.

A further object of the invention is to provide a joint between glass and metal parts which will be tight at all times and in which the glass will not be injured by differential expansion and contraction.

A further object of the invention is to provide a joint between metal and glass parts of a tank having packing which is compressed by resilient means to compensate for changes in the dimensions of the connected parts.

Another object is to provide a device of the class named which shall be of improved construction and operation.

Other objects and advantages will appear from the following description.

The invention is exemplified by the combination and arrangement of parts shown in the accompanying drawing and described in the following specification, and it is more particularly pointed out in the appended claims.

In the drawing:

Fig. 1 is a fragmentary elevation showing an expansion tank for a bushing insulator having one embodiment of the present invention applied thereto.

Fig. 2 is a fragmentary section substantially on line 2—2 of Fig. 1.

Figs. 3, 4 and 5 are fragmentary vertical sections showing modifications of the invention.

In bushing insulators, particularly those used for high voltages, it is common practice to use outer insulating members or shells together with a series of baffles on the inside. The intervening space is filled with oil or insulating compound in order to prevent flashover inside the shell. In order to be sure that the bushing is filled with the insulating oil or compound at all times, it has been customary to use an expansion chamber connected with the interior of the bushing and made of glass or provided with a gage glass. Owing to the differential expansion for changes in temperature between the glass and the metal, difficulty is frequently encountered due to breakage or leaking at the joints between the glass and metal.

A relatively small gage glass has material advantages over a large glass as the differential movement, particularly transverse to the axis of the glass, and the danger of breakage is less for a small glass than for a large one. Where the gage glass has considerable length, as in the case of a large bushing, the relative longitudinal movement between the gage glass and the metal in which the glass is set may be appreciable and cause the joint between the gage glass and metal to leak in time.

With my improved type of construction the above difficulties are materially reduced or eliminated, and a construction is provided which is very simple to manufacture. The construction is also such that repairs may be readily made should the gage glass be accidentally broken or a defective gasket used.

In the form of the invention shown in Fig. 1, a gage glass 13 is used to indicate the oil level in a metal expansion chamber comprising a lower part 10 and a cover 11. The main body of the expansion chamber has a reentrant portion 12 in its side wall forming a recess for the gage glass 13. The recess is closed at its top by a web or flange having an opening 14 which will permit the gage glass to pass into the recess. The lower face of the recess has a groove 15 which will permit insertion of the gasket 16 and the lower end of the gage glass 13. The lower face of the recess connects to the inside of the chamber by a passage 17, permitting oil to flow from the inside of the chamber to the inside of the gage glass. A gasket 18 is preferably placed between the gage glass 13 and the clamping washer 19. The clamping washer 19 is provided with openings 20 so that the inside of the gage glass connects with the inside of the expansion chamber at both top and bottom, thus preventing an air trap. A resilient clamping rod 21 is used to tighten the washer 19 against the gaskets 16 and 18.

The gasket 16 will have little or no movement with respect to the gage glass and the material composing the expansion chamber. There may, however, be some longitudinal movement at the upper end of the gage glass with respect to the adjacent metal in the expansion chamber. In general, leakage will not take place if the gasket 16 at the lower end makes a tight seal, as the oil level is generally well below the top of the glass or the location of gasket 18. For shipping, however, and where it is desired to maintain a perfectly air tight seal between the inside and outside of the bushing, it is advisable to maintain a tight joint between the upper end of the gage glass and the gasket 18 and the opening 14. By selecting a suitable gasket the downward pressure on the gasket 18 will cause it to expand laterally and cause a tight seal between the gasket and the opening 14, as well as between the gasket 18 and the gage glass. This gasket forms an expansion joint for longitudinal movement. It is highly advisable, however, that pressure be maintained on this gasket, as well as on the gasket 16 at all times. If an ordinary bolt were used to hold the washer 14, the differential expansion or contraction between the bolt and the gage glass might permit of leakage at the ends of the gage glass. By using a longitudinally resilient bolt of a waved or twisted form, such as are shown in my prior application Serial Number 563,342, it is possible to provide sufficient resiliency to insure tightness at all times. This bolt may be painted white or any convenient color so that the height of oil or filling medium will show up to better advantage.

The separable top 11 of the expansion chamber is clamped to the body 10 by longtiudinally resilient bolts 22. These bolts are provided with blind nuts 23 and gaskets 24. A gasket 25 is placed in a groove in the cover 11. The projection 26 on the main body of the expansion chamber 10 bears upon this gasket. With this arrangement, it is possible to provide a construction which will tend to maintain tightness for differential movement for the parts or for change in thickness or volume of the gaskets under pressure or heat.

In the modified detail shown in Fig. 3, the through bolt 21 is omitted and resilient pressure for the gaskets 16 and 18 is provided by a plug nut 29 threaded into the opening 14. In order to provide resiliency, a spring washer 30 is placed between the plug nut and the washer 19. Any form of resilient means may be used for the washer 30, such as a helical spring, either used in longitudinal or in circumferential position. By screwing down the nut 29 into the threaded socket 14, necessary pressure can be provided for, forming a tight seal between the gage glass and expansion chamber. This arrangement may be used with the separable cover shown in Fig. 1. In the arrangement shown in Fig. 1, additional resiliency may be provided by a separate spring washer, like that of Fig. 3, where the bolt 21 does not provide sufficient resiliency.

In the modification shown in Fig. 4, the resiliency is provided by a spring 31 which presses upon the washer 32. In this construction two gaskets are provided, one numbered 33 for sealing the joint between the washer 32 and gage glass 13, and another gasket 34 for sealing the joint between the gage glass 13 and the outer chamber. Where the gasket 34 forms an effective seal, the gasket 33 is needed only to produce pressure on the lower gasket. If desired, the general arrangement may be the same as that used in Fig. 1 with the exception that resiliency may be provided by the spring 31 or its equivalent.

Any of the arrangements may be used with a one-piece expansion chamber in which the cover and main body are combined. Such an arrangement is shown in Fig. 5. In this figure the general arrangement for clamping the gage glass and gaskets may be the same as that shown in either Figs. 1, 2 or 3. The cap 35, however, forms an opening so that pockets may be machined and the gage glass, together with gaskets and clamping means, may be inserted. If desired, the expansion chamber may be made in two pieces and the two parts soldered together, thus eliminating gaskets or holding means. Such an arrangement could also be obtained by soldering the joint at 36 in Fig. 1 or in any other convenient way.

Reference to the several types of construction will show that the finishing of the various parts is comparatively simple. The faces of the glands or washers may be inclined, if desired, to throw the gaskets in a given direction to better insure tightness. In general, the only finishing required on the gage glass is to square or grind the ends and to insure a fairly smooth fit in the glands or grooves required for the gaskets. If hard gaskets are used, greater accuracy will be required. In general, however, some slight cushioning should be provided in the gaskets so that any slight unevenness, due to distortion in the metal, lack of accuracy or slight differential movement, will not set up an undue stress which will cause a rupture of the gage glass or a loosening in the seal. In many cases, metal gaskets may be used, such as copper-asbestos gaskets or corrugated metal gaskets. If desired, paper, rubber, fibre or a combination of materials may be used to provide necessary resiliency in the gasket and tightness over a wide range of conditions.

The gaskets may be coated with varnish or paint which will further tend to insure tightness. The arrangement is such, however, that this is not generally necessary. If desired, a part or all of the resilient bolts may be made of a material having a low coefficient of expansion for changes in temperature, such as invar. Where this member has approximately the same linear coefficient of expansion as the glass, the resiliency may be reduced to a minimum and still maintain tightness. Where appreciable resiliency, however, may be developed in the clamping means, much time is saved in the assembly as the gaskets will be automatically tightened as they deform under pressure.

With a properly designed clamping bolt, it is possible to limit the stress which may be placed upon the gaskets and gage glass and still maintain pressure. The same is true where a resilient spring or its equivalent is interposed between the clamping means and the washer 19 or 32. The correct amount of pressure on the clamping means may be insured by limiting the amount of thread on the tightening bolt so that the nut can be screwed down only to a predetermined position or by allowing the nut to come to rest on a shoulder 37 on the clamping bolt, as shown in Fig. 4, or a blind nut may be used to limit the tightness, as shown at 23 in Fig. 1.

Another way in which the pressure exerted upon the glass may be limited is by regulating the strength of the clamping bolt or spring so that if excessive force is exerted on the spring, tending to press upon the glass, the elastic limit of the bolt or spring will be exceeded so that it will yield by simply straightening out the waves or other deformation of the bolt without exerting further pressure on the glass.

I claim:

1. An expansion chamber for electrical apparatus comprising a bottom, side walls and a removable cover, a longitudinally resilient tension member disposed within said chamber and having one end thereof secured to said bottom but extending only partially therethrough, and threaded means engaging the other end of said rod and holding said cover in place.

2. An expansion chamber for electrical apparatus comprising integrally formed bottom and side walls and a removable cover, packing interposed between said side wall and cover to form a liquid tight joint, and a longitudinally resilient tension member holding said cover in place and exerting yielding pressure on said packing, said tension member being disposed in said chamber and having one end thereof threaded into a blind opening in said bottom.

3. An expansion chamber for electrical apparatus having a gage glass communicating therewith for indicating the surface level of liquid within said chamber, closure for the ends of said gage glass, packing at one end of said gage glass for forming a liquid tight joint between said glass and closure, and a longitudinally resilient rod extending through said gage glass and pressing said gage glass upon said packing to maintain a liquid tight joint, notwithstanding differential movement of said glass and chamber due to temperature changes, said rod being threaded into a blind opening in the closure at one end of said glass and extending through the opening in the closure at the other end of said glass, and a nut threaded on the projecting end of said rod.

4. An expansion chamber for electrical apparatus having a gage glass communicating with the interior thereof, packing interposed between the lower end of said gage glass and a portion of said chamber forming a closure for said lower end, a longitudinally resilient rod extending through said gage glass and threaded into a blind opening in said portion, and means connected with said rod for exerting pressure on the upper end of said glass to press said gage glass against said packing.

5. An expansion chamber for electrical apparatus comprising a metal part and a glass part for disclosing the surface level of liquid within said chamber, packing interposed between said glass and metal parts, resilient means for holding said glass and metal parts against said packing, a threaded member cooperating with said resilient means for exerting pressure on said packing, and means for limiting the pressure that can be exerted by said threaded member and said resilient means to an amount insufficient to break said glass.

ARTHUR O. AUSTIN.